(12) United States Patent
Allan (10) Patent No.: US 11,829,190 B2
(45) Date of Patent: Nov. 28, 2023

(54) DATA ROUTING FOR EFFICIENT DECOMPRESSION OF COMPRESSED DATA STORED IN A CACHE

(71) Applicant: Advanced Micro Devices, Inc., Santa Clara, CA (US)

(72) Inventor: Jeffrey Christopher Allan, Billerica, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/557,815

(22) Filed: Dec. 21, 2021

(65) Prior Publication Data

US 2023/0195625 A1 Jun. 22, 2023

(51) Int. Cl.
*G06F 12/08* (2016.01)
*G06F 12/0802* (2016.01)
*G06T 9/00* (2006.01)

(52) U.S. Cl.
CPC ............ *G06F 12/0802* (2013.01); *G06T 9/00* (2013.01); *G06F 2212/401* (2013.01)

(58) Field of Classification Search
CPC .. G06F 12/0802; G06F 2212/401; G06T 9/00
USPC ........................................................ 711/118
See application file for complete search history.

(56) References Cited

U.S. PATENT DOCUMENTS

| 11,604,733 B1 | 3/2023 | Krueger |
| 2007/0043906 A1 | 2/2007 | Hall et al. |
| 2010/0250856 A1 | 9/2010 | Owen et al. |
| 2011/0066807 A1 | 3/2011 | Hay et al. |
| 2014/0032845 A1 | 1/2014 | Avudaiyappan et al. |
| 2014/0181412 A1 | 6/2014 | Thottethodi et al. |
| 2014/0285505 A1* | 9/2014 | Nakanishi ............ H04N 19/40 345/545 |
| 2015/0169451 A1 | 6/2015 | Jackson |
| 2015/0169457 A1 | 6/2015 | Jackson |

(Continued)

FOREIGN PATENT DOCUMENTS

| KR | 20100038109 A | 4/2010 |
| KR | 20200035311 A | 4/2020 |

OTHER PUBLICATIONS

U.S. Appl. No. 17/557,793, "Non-Final Office Action", U.S. Appl. No. 17/557,793, dated Mar. 9, 2023, 10 pages.

(Continued)

*Primary Examiner* — Hua J Song
(74) *Attorney, Agent, or Firm* — FIG. 1 Patents (57) ABSTRACT

Data routing for efficient decompressor use is described. In accordance with the described techniques, a cache controller receives requests from multiple requestors for elements of data stored in a compressed format in a cache. The requests include at least a first request from a first requestor and a second request from a second requestor. A decompression routing system identifies a redundant element of data requested by both the first requestor and the second requestor and causes decompressors to decompress the requested elements of data. The decompression includes performing a single decompression of the redundant element. After the decompression, the decompression routing system routes the decompressed elements to the plurality of requestors, which includes routing the decompressed redundant element to both the first requestor and the second requestor.

20 Claims, 5 Drawing Sheets

(56) References Cited

U.S. PATENT DOCUMENTS

| | | | |
|---|---|---|---|
| 2015/0178214 A1* | 6/2015 | Alameldeen | G06F 16/1744 711/125 |
| 2016/0071313 A1 | 3/2016 | Laine et al. | |
| 2016/0299849 A1 | 10/2016 | Herdrich et al. | |
| 2017/0286220 A1* | 10/2017 | Gerhard | G06F 11/1096 |
| 2017/0337132 A1 | 11/2017 | Eickemeyer et al. | |
| 2019/0129863 A1 | 5/2019 | Jibbe et al. | |
| 2019/0340123 A1 | 11/2019 | Herdrich et al. | |
| 2021/0318961 A1 | 10/2021 | Peterson et al. | |
| 2022/0318641 A1 | 10/2022 | Carreira-Perpiñán et al. | |
| 2023/0126531 A1 | 4/2023 | Croxford et al. | |
| 2023/0195640 A1 | 6/2023 | Allan | |
| 2023/0195641 A1 | 6/2023 | Allan | |

OTHER PUBLICATIONS

PCT/US2022/052885 , "International Search Report and Written Opinion", PCT Application No. PCT/US2022/052885, dated Apr. 21, 2023, 12 pages.

Shihabul Haque, Mohammad , et al., "DEW: A fast level 1 cache simulation approach for embedded processors with FIFO replacement policy", 2010 Design, Automation & Test in Europe Conference & Exhibition (DATE 2010) [retrieved Mar. 9, 2023]. Retrieved from the Internet <https://doi.org/10.1109/DATE.2010.5457153>, Mar. 2010, 6 pages.

Shou, Lidan , et al., "The Hierarchical Degree-of-Visibility Tree", IEEE Transactions on Knowledge and Data Engineering, vol. 16, No. 11 [retrieved Mar. 9, 2023]. Retrieved from the Internet <https://doi.org/10.1109/TKDE.2004.78>, Nov. 2004, 13 pages.

U.S. Appl. No. 17/557,731, "Non-Final Office Action", U.S. Appl. No. 17/557,731, dated Jun. 23, 2023, 17 pages.

U.S. Appl. No. 17/557,793, "Notice of Allowance", U.S. Appl. No. 17/557,793, dated Jun. 27, 2023, 5 pages.

U.S. Appl. No. 17/557,793, "Notice of Allowance", U.S. Appl. No. 17/557,793, dated Aug. 9, 2023, 2 pages.

Kluge, W.E. , "Traversing Binary Tree Structures with Shift-Register Memories", IEEE Transactions on Computers [retrieved Jul. 11, 2023]. Retrieved from the Internet <https://doi.ieeecomputersociety.org/10.1109/TC.1977.1674757>, Nov. 1977, 11 pages.

Zhang, Weihua , et al., "A High Throughput B+tree for SIMD Architectures", IEEE Transactions on Parallel and Distributed Systems, vol. 31, No. 3 [retrieved Jun. 8, 2023]. Retrieved from the Internet <https://doi.org/10.1109/TPDS.2019.2942918>, Mar. 1, 2020, 14 pages.

\* cited by examiner

DATA ROUTING FOR EFFICIENT DECOMPRESSION OF COMPRESSED DATA STORED IN A CACHE

BACKGROUND

Elements of data are often stored in compressed formats in caches. Compressed data storage is one aspect that enables caches to serve requests for their data effectively. As one example, various applications store textures for computer graphics in a cache via a lossy compressed format, which compresses a block of N×M texels of a texture into a single compressed block of data. Before a processing unit performs operations in relation to such texels (e.g., applying a filter), the texels are decompressed. Decompression involves providing portions of the compressed data blocks to decompressors, which perform mathematical operations, such as linear interpolation, on those portions to output the decompressed texels.

BRIEF DESCRIPTION OF THE DRAWINGS

The detailed description is described with reference to the accompanying figures.

DETAILED DESCRIPTION

Overview

Decompression of compressed data elements stored in a cache involves providing portions of the compressed data to decompressors. Those decompressors perform mathematical operations, such as linear interpolation, on the compressed data to output the decompressed elements. As compared to other components, decompressors are relatively expensive in terms of the hardware area and power they consume. Consequently, reducing a number of decompressors used to decompress a particular amount of compressed data during a period of time (e.g., a cycle) is advantageous. In addition, due to large compression ratios of some lossy formats, storing uncompressed data elements in various caches (e.g., an L0 vector cache), can cause cache thrashing by reducing effective associativity.

Data routing for efficient decompression of compressed data stored in a cache is described herein. In one or more implementations, a decompression routing system routes portions of compressed data to a bank of decompressors and routes decompressed elements from the decompressors to respective requestors of the data, e.g., respective lanes of a vector processor. The decompression routing system efficiently uses the decompressors by routing the portions of compressed data so that a respective decompressor decompresses a portion of the data that corresponds to a single requested element one time. The decompression routing system also routes the portions of compressed data so that a decompressor does not decompress a portion of compressed data decompressed by another decompressor. Due to this routing, an element requested by at least one of multiple requests is output by only one of the decompressors used to handle the multiple requests. In various scenarios, a unique element of data, stored compressed in the cache, is requested by multiple requestors. In such scenarios, after the respective portion of compressed data is decompressed by the single decompressor, the decompression routing system routes the decompressed element to each of the requestors that requested the element. In other words, the decompression routing system routes the decompressed element from the output of the respective decompressor to each of the multiple requestors that requested the element, and does so without storing the decompressed element in cache.

In various implementations, the decompression routing system includes a first routing structure and a second routing structure, where the first routing structure is disposed between a cache and the inputs of the bank of decompressors and the second routing structure is disposed between the outputs of the bank of decompressors and the requestors, e.g., lanes of a vector processor. The first and second routing structures enable the decompression routing system to route the data as described above and below. In at least one example, the routing structures are logic components, such as crossbars or some other configuration of multiplexers and/or demultiplexers, that are cheaper than decompressors in terms of hardware area and power they consume. Through inclusion of such routing structures which route data to and from the decompressors in the manner described throughout, the decompression routing system reduces a number of decompressors used to serve a particular number of requests, as compared to conventional systems. Additionally, this routing enables the decompressed data to be routed to the requestors without storing uncompressed data in the cache. By routing the data without storing it in the cache, the decompression routing system reduces cache trashing (e.g., in an L0 vector cache), which can be caused by storing uncompressed data elements with large compression ratios in the cache.

In some aspects, the techniques described herein relate to a method including: receiving, from a plurality of requestors, requests for elements of data stored in a compressed format in a cache, the requests including at least a first request from a first requestor and a second request from a second requestor; identifying a redundant element of data requested by both the first requestor and the second requestor; decompressing requested elements of the data, the decompressing including performing a single decompression for the redundant element; and routing decompressed elements to the plurality of requestors, the routing including routing the decompressed redundant element to both the first requestor and the second requestor.

In some aspects, the techniques described herein relate to a method, wherein the decompressed redundant element is routed to both the first requestor and the second requestor in a same cycle.

In some aspects, the techniques described herein relate to a method, wherein the decompressed redundant element is routed to the first requestor and the second requestor in different cycles.

In some aspects, the techniques described herein relate to a method, further including reusing the decompressed redundant element to serve a subsequent request without performing a second decompression for the redundant element.

In some aspects, the techniques described herein relate to a method, further including: routing different portions of the data stored in the compressed format to respective decompressors, the different portions of data each corresponding to a requested element; and decompressing, by each respective decompressor, a different portion to produce a respective decompressed element.

In some aspects, the techniques described herein relate to a method, wherein the different portions of data are routed to inputs of the respective decompressors via a first crossbar.

In some aspects, the techniques described herein relate to a method, wherein the decompressed elements are routed from outputs of the respective decompressors to the plurality of requestors via a second crossbar.

In some aspects, the techniques described herein relate to a method, wherein the second crossbar routes the decompressed redundant element from an output of a respective decompressor to both the first requestor and the second requestor.

In some aspects, the techniques described herein relate to a method, wherein the elements of data are texels of a texture for computer graphics.

In some aspects, the techniques described herein relate to a method, wherein the compressed format is a compressed block of the texels.

In some aspects, the techniques described herein relate to a method, wherein the elements of data stored in the compressed format are each unique, one element to another, and the redundant element is a unique element requested via the first request and the second request.

In some aspects, the techniques described herein relate to a system including: a cache to store data in a compressed format; a controller to receive requests from a plurality of requestors for access to elements of the data in the cache, the requests including at least a first request from a first requestor and a second request from a second requestor; and a decompression routing system to: identify a redundant element of data requested by both the first requestor and the second requestor; decompress requested elements of the data, including performing a single decompression for the redundant element; and route decompressed elements to the plurality of requestors, including routing the decompressed redundant element to both the first requestor and the second requestor.

In some aspects, the techniques described herein relate to a system, wherein the decompression routing system includes a plurality of decompressors to decompress portions of the data stored in the compressed format to produce the decompressed elements.

In some aspects, the techniques described herein relate to a system, wherein the decompression routing system includes a first crossbar and a second crossbar connected to a plurality of decompressors, wherein: the first crossbar is configured to route different portions of the data stored in the compressed format to inputs of respective decompressors, the different portions of data each corresponding to a requested element; and the second crossbar is configured to route the decompressed elements from outputs of the respective decompressors to the plurality of requestors.

In some aspects, the techniques described herein relate to a system, wherein the first crossbar routes a different portion of data to a single decompressor for decompression, and the single decompressor decompresses the different portion and not other different portions of the data.

In some aspects, the techniques described herein relate to a system, wherein the second crossbar routes the decompressed redundant element from an output of a respective decompressor to both the first requestor and the second requestor.

In some aspects, the techniques described herein relate to a method including: receiving requests for texels stored in a compressed block in a cache, the requests being associated with a plurality of lanes of a processor; routing, by a first crossbar, a portion of the compressed block that corresponds to each requested texel to a respective decompressor of a plurality of decompressors; decompressing, by respective decompressors, requested texels, wherein each requested texel that is requested for multiple lanes of the plurality of lanes is decompressed by only the respective decompressor; and routing, by a second crossbar, decompressed texels to respective lanes of the plurality of lanes, wherein a decompressed texel that is requested by multiple lanes is routed by the second crossbar to each of the multiple lanes.

In some aspects, the techniques described herein relate to a method, further including decompressing, by the respective decompressors, the requested texels in a same cycle.

In some aspects, the techniques described herein relate to a method, further including decompressing, by the respective decompressors, the requested texels in different cycles.

In some aspects, the techniques described herein relate to a method, wherein the decompressing further includes preventing a decompressor from decompressing the portion of the compressed block that is decompressed by another decompressor.

Figure 1:
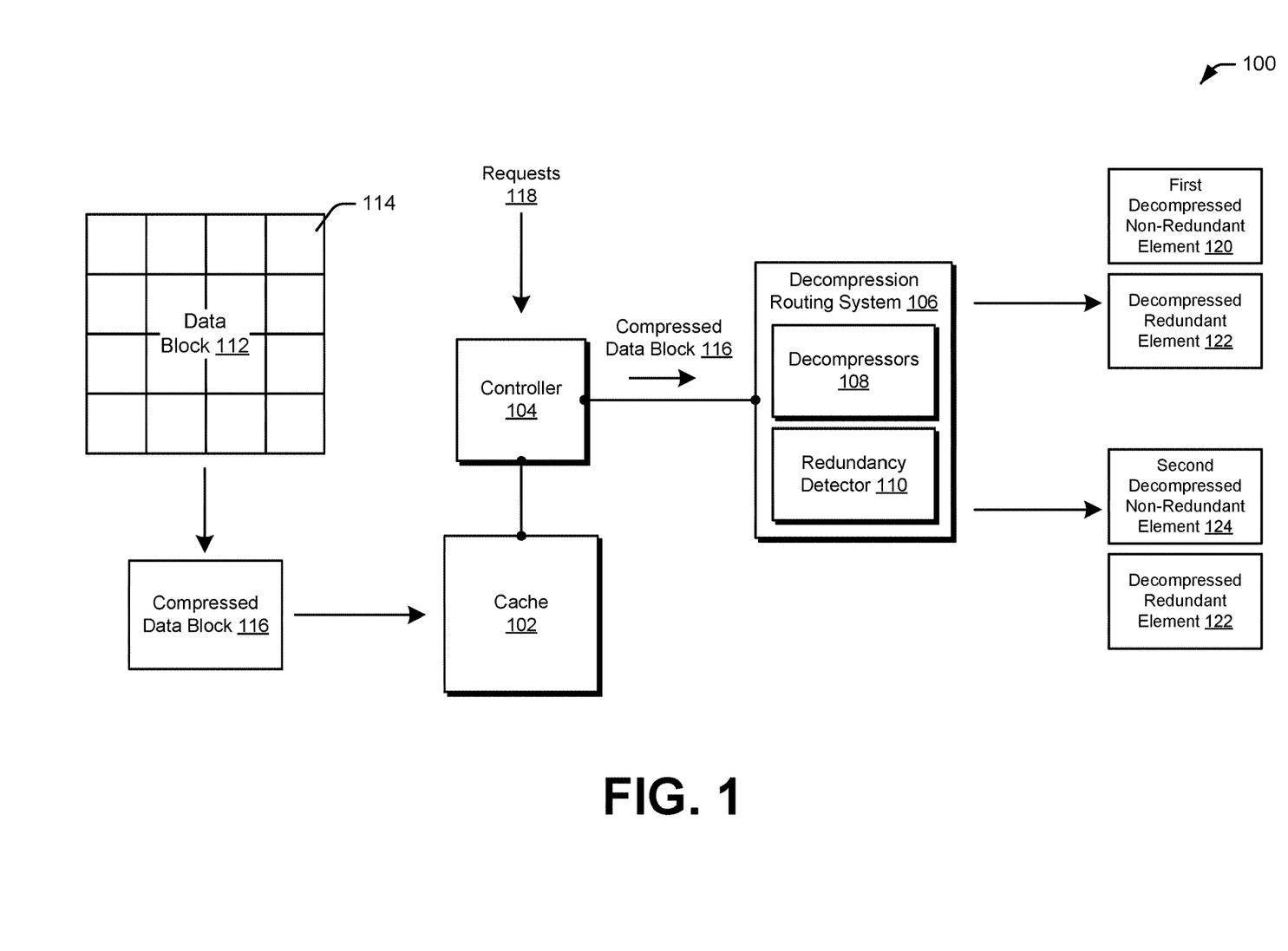
FIG. 1 is a block diagram of a non-limiting example system having a cache and a decompression routing system that efficiently uses decompressors for decompressing data elements stored in a compressed format.

FIG. 1 is a block diagram of a non-limiting example system 100 having a cache and a decompression routing system that efficiently uses decompressors for decompressing data elements stored in a compressed format. In particular, the system 100 includes cache 102, controller 104, and decompression routing system 106, which includes decompressors 108 and redundancy detector 110.

The illustrated example also includes data block 112, which is depicted including a plurality of elements 114 of data. In one or more implementations, the data block 112 is a block of texels, such that each of the elements 114 of data corresponds to an individual texel. In other implementations, the elements 114 correspond to different data than texels and the data block 112 corresponds to vectors or matrices of those elements. Examples of different data include, but are not limited to, pixels, weather data elements, financial data elements, cryptographic elements, scientific data elements, traffic data elements, health data elements, and other data elements used by machine learning models, to name just a few. In accordance with the described techniques, the data block 112 is compressed, e.g., according to one or more data compression techniques, to form compressed data block 116. The compressed data block 116 is stored in the cache 102. For example, the compressed data block 116 is stored in one or more cachelines of the cache 102.

The cache 102, the controller 104, the decompression routing system 106, and one or more requestors (not shown) of the elements 114, are coupled to one another via a wired or wireless connection. Example wired connections include, but are not limited to, buses connecting the cache 102, the controller 104, the decompression routing system 106, and the one or more requestors. Examples of requestors include central processing units (e.g., CPU), parallel accelerated processors (e.g., graphics processing units), digital signal processors, and hardware accelerators, to name just a few.

Figure 2:
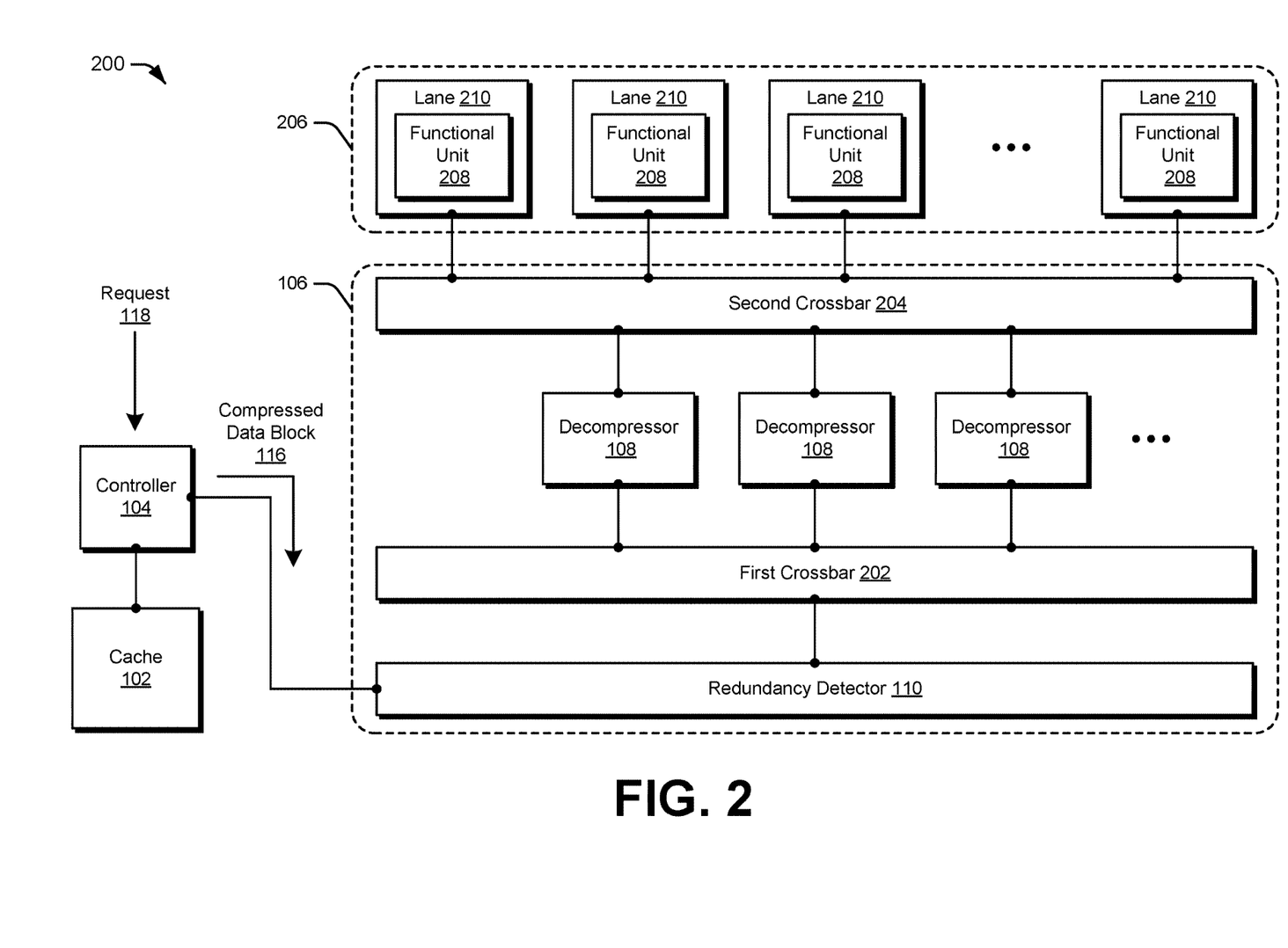
FIG. 2 depicts a non-limiting example in which multiple crossbars are used by a decompression routing system to route data for efficient decompression.
Figure 3:
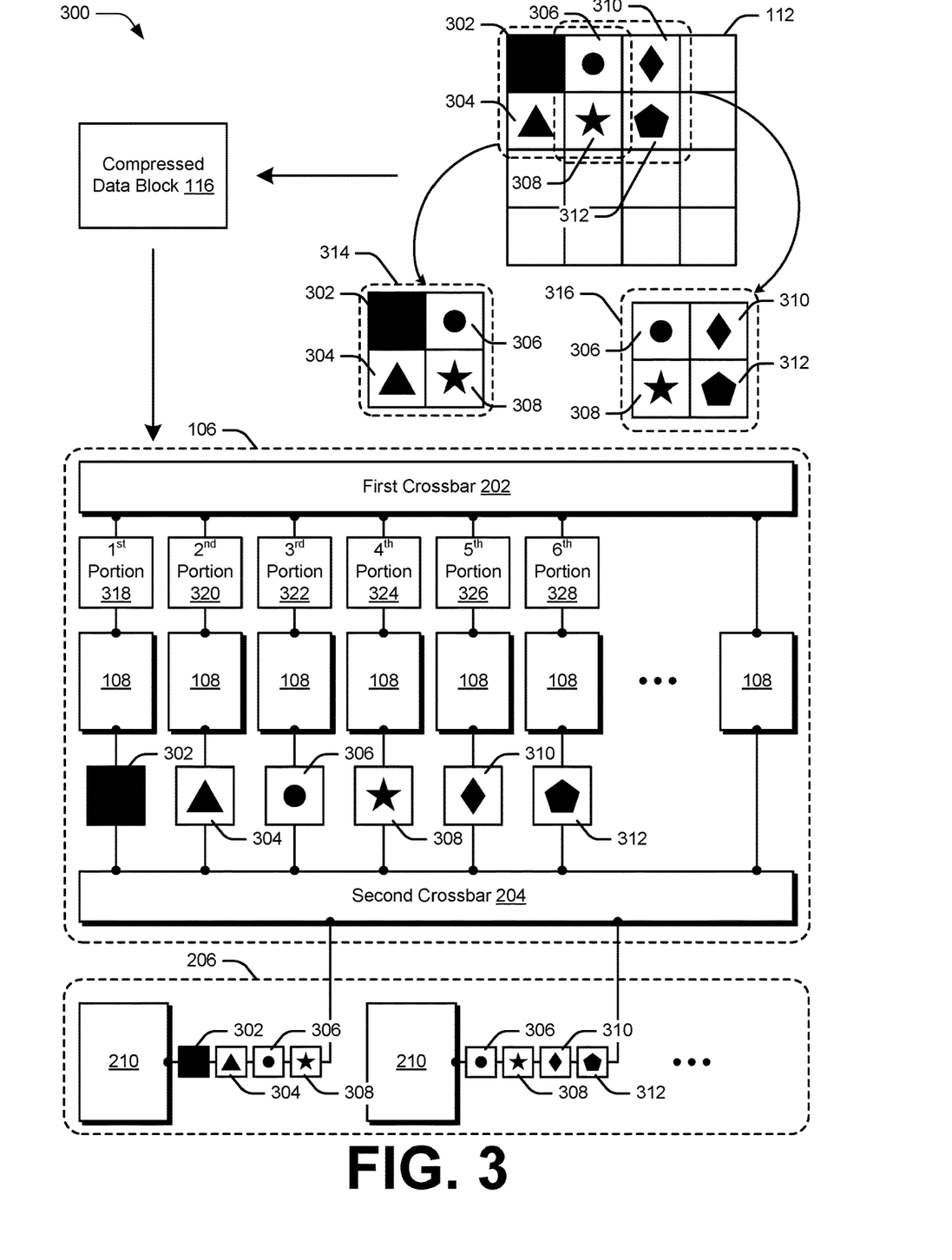
FIG. 3 depicts a non-limiting example in which the decompression routing system routes data for decompression and routes decompressed data to requestors.

Examples in which one or more requestors correspond to a vector processor, or components of a vector processor (e.g., lanes), are discussed in detail in relation to FIGS. 2 and 3.

The cache 102 is a hardware or software component that stores data (e.g., at least temporarily) so that a future request for the data is served faster from the cache 102 than from a data store (not shown). Examples of a data store include main memory (e.g., random access memory), a higher-level cache (e.g., L2 cache when the cache 102 is an L1 cache), secondary storage (e.g., a mass storage device), and removable media (e.g., flash drives, memory cards, compact discs, and digital video disc). In one or more implementations, the cache 102 is at least one of smaller than the data store, faster at serving data to a requestor than the data store, or more efficient at serving data to the requestor than the data store. Additionally or alternatively, the cache 102 is located closer to the requestor than is the data store. It is to be appreciated that in various implementations the cache 102 has additional or different characteristics which make serving at least some data to a requestor from the cache 102 advantageous over serving such data from a data store.

In one or more implementations, the cache 102 is a memory cache, such as a particular level of cache (e.g., L1 cache) where the particular level is included in a hierarchy of multiple cache levels (e.g., L0, L1, L2, L3, and L4). In some variations, the cache 102 is a hardware component built into and used by a requestor, e.g., built into and used by a CPU or a graphics processing unit (e.g., GPU). In other examples, the cache 102 is implemented at least partially in software. The cache 102 is also implementable in different ways without departing from the spirit or scope of the described techniques.

In accordance with the described techniques, requests 118 are received for one or more of the elements 114 of data stored in the compressed format in the cache 102, e.g., stored in the compressed data block 116 using one or more cachelines of the cache 102. In various implementations, the requests 118 are received and served by the controller 104 of the cache 102. For example, the controller 104 receives the requests 118 and serves the compressed data block 116, or portions of the compressed data block 116 which correspond to the elements 114 requested by the requests 118, to the decompression routing system 106.

The decompression routing system 106 decompresses the compressed data block 116, or portions of the compressed data block 116, to provide the elements 114 requested by the requests 118 to the respective requestors. The decompression routing system 106 routes portions of the compressed data block 116 to the decompressors 108, which process the compressed data according to one or more decompression algorithms and output decompressed data, e.g., decompressed data elements. In one or more implementations, the decompressors 108 are decoders, which process the compressed data according to the one or more decompression algorithms and output the compressed data. In one example, a decompressor 108 is implemented by a respective decoder. In addition to routing portions of the compressed data block 116 to the decompressors 108 (e.g., decoders), the decompression routing system 106 also routes the decompressed data elements to the requestors corresponding to the requests 118.

In contrast to conventional systems which utilize decompressors (e.g., implemented by decoders) on a per requestor basis (e.g., one decompressor per "lane" for lanes of a virtual processor), the decompression routing system 106 routes the compressed data portions to the decompressors 108, and routes decompressed data from the decompressors 108 to the requestors, so that the decompressors 108 perform decompression in relation to a unique data element a single time. Specifically, this routing causes compressed data which corresponds to a unique element 114 of the data to be decompressed by a single decompressor 108 (e.g., a single decoder). During a given cycle, this single decompressor 108 decompresses the data that corresponds to the unique element 114 of data and not other compressed data that corresponds to different elements. The decompression routing system 106 then shares the decompressed element of data, from the single decompressor 108, with all the requestors that requested the element. In other words, if there are redundant requests for a same element 114 of the data, a single decompressor 108 decompresses the respective compressed data, and the decompressed redundant data element is shared by routing it from the single decompressor 108 to the multiple requestors that requested the element.

In one or more implementations, the redundancy detector 110 identifies which of the elements 114, requested by the requestors, are redundant. As described herein, a "redundant" data element is an individual element 114 of data that is requested via multiple requests 118. For example, if requests associated with at least two requestors request a same element, then that element is a "redundant" element. In another example, where the data block 112 is a block of texels and each element 114 is a unique texel, an individual texel requested by two different requestors is a "redundant" data element. This scenario occurs, for example, when two lanes of a vector processor request a same texel. In one or more implementations, the redundancy detector 110 identifies which of the elements 114 are redundant based on respective addresses of the elements, such that redundant elements correspond to a same address, e.g., a same memory address. Alternatively or in addition, the redundancy detector 110 identifies which of the elements 114 are redundant in other ways, such as by comparing the data of the elements 114, e.g., comparing texel values or pixel values, one to another.

Based on identification of which elements 114 requested are redundant, the decompression routing system 106 prevents the decompressors 108 from performing decompression in relation to a given element more than once. Rather than decompressing compressed data of an element for each request that requests the element, the decompression routing system 106 limits decompression for a given element to a single decompressor 108. The decompression routing system 106 then shares the element as decompressed with all the requestors that requested the element.

To demonstrate this, the illustrated example is depicted including first decompressed non-redundant element 120, decompressed redundant element 122, and second decompressed non-redundant element 124. In this example, the decompression routing system 106 is shown providing the first decompressed non-redundant element 120 and the decompressed redundant element 122 to a first requestor (not shown) and providing the second decompressed non-redundant element 124 and the decompressed redundant element 122 to a second requestor (not shown). In accordance with the described techniques, only three of the decompressors 108 are used to decompress the compressed data block 116, or portions of it that correspond to the three elements, in order to output the first decompressed non-redundant element 120, the decompressed redundant element 122, and the second decompressed non-redundant element 124.

Although only three of the decompressors 108 are used for decompression of those three elements, the decompression routing system 106 is depicted routing two elements of the data to each requestor, thus totaling four elements output by the system. This is because the decompression routing system 106 shares or otherwise "reuses" the decompressed redundant element 122 by providing it to the first requestor and also providing it to the second requestor. In accordance with this example, the first requestor requests (via a request 118) a first of the elements 114 and a second of the elements 114, which correspond to the first decompressed non-redundant element 120 and the decompressed redundant element 122. Further, the second requestor requests (via a request 118) the second of the elements 114 and a third of the elements 114, which correspond to the decompressed redundant element 122 and the second decompressed non-redundant element 124, respectively.

To prevent decompression more than once of a portion of the compressed data block 116 that corresponds to the second of the elements 114 (e.g., which corresponds to the decompressed redundant element 122), the redundancy detector 110 identifies that this element is requested via the requests 118 by both the first and second requestors. Responsive to this detection, the decompression routing system 106 routes a respective portion of the compressed data block 116 to just one of the decompressors 108, which decompresses the portion to produce the decompressed redundant element 122. The decompression routing system 106 also routes a respective portion of the compressed data block 116 to a second of the decompressors 108 to produce the first decompressed non-redundant element 120 and routes a respective portion of the compressed data block 116 to a third of the decompressors 108 to produce the second decompressed non-redundant element 124. In the context of how portions of the compressed data block 116 are routed to the decompressors 108 so that they perform decompression in relation to a data element a single time, and in the context of how a data element for which decompression has been performed once is shared with multiple requestors, consider the following discussion.

FIG. 2 depicts a non-limiting example 200 in which multiple crossbars are used by a decompression routing system to route data for efficient decompressor use.

The illustrated example 200 includes from FIG. 1 the cache 102 and the decompression routing system 106, having multiple decompressors 108 (e.g., decoders) and a redundancy detector 110. To route data so that elements requested by multiple requestors are decompressed once using a single decompressor 108 (e.g., decoder), the decompression routing system 106 includes a first crossbar 202 and a second crossbar 204, in one or more implementations. The first crossbar 202, the decompressors 108 (e.g., decoders), the second crossbar 204, and the redundancy detector 110, are coupled to one another via wired or wireless connections. Wired connections include, but are not limited to, buses connecting the first crossbar 202, the decompressors 108 (e.g., decoders), the second crossbar 204, and the redundancy detector 110. The first crossbar 202 is connected to inputs of the decompressors 108 and the second crossbar 204 is connected to outputs of the decompressors 108. In terms of a flow of data, the decompressors 108 are thus positioned between the first crossbar 202 and the second crossbar 204. Additionally, the first crossbar 202 is positioned between the cache 102 and the decompressors 108, and the second crossbar 204 is positioned between the decompressors 108 and the requestors.

The illustrated example 200 also includes processor 206 having multiple functional units 208 arranged in lanes 210. In one or more implementations, the processor 206 is a vector processor. A further example of the processor 206 is a processor having a single instruction, multiple data (SIMD) architecture configured for parallel processing. In accordance with the described techniques, the lanes 210 are examples of requestors. The functional units 208 perform operations on elements of data that are provided to the respective lane 210. For example, the functional units 208 perform such operations according to instructions received by the processor 206 in connection with the elements, e.g., according to vector instructions when the processor 206 is a vector processor. Although not depicted, in one or more implementations the lanes 210 also include, or otherwise have access to, a register (e.g., a vector register) or a partition of a register (e.g., a partition of a vector register). This register is usable to store data temporarily, e.g., while waiting for a decompressed data element from one of the decompressors 108. In at least one example, the processor 206 includes a controller (not shown). The controller provides control signals to the lanes 210 to execute multiple element operations for each instruction (e.g., each vector instruction). To execute a vector instruction, for instance, the controller applies an identical control signal to each of the lanes 210 so that they execute multiple operations on elements in parallel every cycle. In one or more implementations, the controller of the processor 206 also provides the requests 118 for accessing the elements 114 stored in the compressed format in the cache 102. In various examples, the requests 118 are each associated with a lane 210, such that data elements requested via a request are provided to a respective lane, which enables the functional unit 208 of that lane 210 to perform operations in relation to the data elements requested for that lane 210.

Responsive to the requests 118, the controller 104 serves the compressed data block 116, or portions of the compressed data which correspond to the elements 114 requested, from the cache 102 to the decompression routing system 106. The redundancy detector 110 identifies the redundant elements requested by two or more of the lanes 210, e.g., in a single cycle. Alternatively or in addition, the redundancy detector 110 identifies the redundant elements requested by one or more of the lanes for different cycles. By way of example, the redundancy detector 110 identifies which of the elements 114 are redundant based on respective addresses of the elements (e.g., memory addresses) and/or by comparing the data of the elements 114 (e.g., comparing texel or pixel values). Based on the redundancy detector 110 detecting the redundant data elements, the first crossbar 202 routes portions of the compressed data block 116 to the decompressors 108 so that each decompressor 108 processes a respective portion of the compressed data block 116. The first crossbar 202 routes the portions so that each decompressor 108 outputs a decompressed data element that is unique in relation to the elements output by the other decompressors 108—no two decompressors 108 are provided compressed data in a given cycle that causes them to output a same decompressed data element. Accordingly, the first crossbar 202 routes portions of the compressed data block 116 to the decompressors 108 to prevent the decompressors 108 from performing decompression in relation to a given element more than once. In this way, the first crossbar 202 limits decompression performed for a given element during a cycle to a single decompressor 108.

The second crossbar 204 receives the output of the decompressors 108 and routes the output of the decompressors 108 to respective lanes 210 of the processor 206, e.g., to the lanes for which the elements were requested. When the output of an individual decompressor 108 (i.e., a decompressed element of data) is requested by more than one lane 210, the second crossbar 204 routes the decompressed element from the individual decompressor 108 to each of the multiple lanes 210 that requested the element. When the output of an individual decompressor 108 (i.e., a decompressed element of data) is requested by a single lane 210, the second crossbar 204 routes the decompressed element from the individual decompressor 108 to the single lane 210 that requested the element.

The first crossbar 202 and the second crossbar 204 include one or more inputs (e.g., input ports), one or more outputs (e.g., output ports), and routing logic (e.g., circuitry). The routing logic enables a signal received via an input of a crossbar to be routed for output via any of the outputs of the crossbar. In at least one example, the first crossbar 202 and the second crossbar 204 are implemented using one or more multiplexers. Alternatively or additionally, the first crossbar 202 and the second crossbar 204 include one or more demultiplexers. Such components are arranged and communicatively coupled in the first crossbar 202, for example, to enable the input to be routed to respective decompressors 108. In accordance with the described techniques, the input to the first crossbar 202 comprises portions of compressed data which correspond to elements 114 of data in a compressed format. The first crossbar 202 also routes the input so that a respective decompressor 108 is the only decompressor 108 performing decompression in relation to a particular element. The components are arranged and communicatively coupled in the second crossbar 204 to receive the outputs of the decompressors 108 as input, e.g., unique decompressed data elements, and route those elements to each of the lanes 210 that requested the elements. In various implementations, different routing structures are used to route data as discussed above and below for efficient decompression. Additionally, use of such different routing structures is contemplated in accordance with the described techniques.

Notably, each decompressed data element received as input during an individual cycle by the second crossbar 204, and from the decompressors 108, is unique from the other decompressed data elements received by the second crossbar 204. The second crossbar 204 is configured to route those unique decompressed data elements, so that the unique data elements received as input to the second crossbar 204 are routed to each of the lanes 210 that requested the data elements. This includes routing a decompressed data element, requested by more than one of the lanes 210, from the individual decompressor 108 that performed the decompression to each of the multiple lanes 210 that requested the data element. Thus, the second crossbar 204 outputs redundant decompressed data elements in various scenarios, e.g., scenarios where an individual data element is requested by more than one lane 210.

By enabling a decompressed data element to be routed to more than one lane 210 for which it is requested, the decompression routing system 106 reduces the number of decompressors used, relative to conventional techniques, for decompressing compressed data in order to fulfill a same set of requests received from multiple requestors, e.g., multiple lanes of a processor. The system is also able to reduce power (e.g., via clock gating, power gating, etc.) consumed by decompressors (e.g., decoders) that are not used during cycles since the system prevents multiple decompressors (e.g., decoders) from performing decompression in relation to a same data element. In one or more implementations, the system reduces the power consumed by the decoders by turning off unused decoders. By reducing the power consumed by unused decompressors (e.g., decoders), the decompression routing system 106 saves power relative to conventional approaches. As a result, a number of decompressors used by the system in various implementations is fewer than conventional systems use, e.g., relative to conventional systems that include a decompressor per lane of a vector processor. In implementations, the described techniques may enable designers and manufacturers to reduce a number of decoders incorporated into system architectures in order to perform a same amount of decompression as conventional architectures. Due to the decompression routing system 106, for instance, the reduced number of decompressors is capable of fulfilling requests for a number of decompressed data elements that conventional systems use more decompressors to fulfill.

In the context of routing unique data elements to requestors, including providing a unique data element to multiple requestors, consider the following discussion.

FIG. 3 depicts a non-limiting example 300 in which the decompression routing system routes data for decompression and routes decompressed data to requestors.

The illustrated example 300 includes from FIG. 1 the decompression routing system 106, which is depicted having multiple decompressors 108, the first crossbar 202, and the second crossbar 204. The illustrated example 300 also depicts the data block 112 and the compressed data block 116 from FIG. 1 as well as the processor 206 from FIG. 2, having multiple lanes 210.

As described above, the data block 112 includes a plurality of elements 114 of data. In this example 300, the elements 114 of data include a first unique element 302, a second unique element 304, a third unique element 306, a fourth unique element 308, a fifth unique element 310, and a sixth unique element 312 (as well as other unique elements 114 of data). In various examples, the data block 112 is compressed into the compressed data block 116, as described above, and stored in the cache 102.

In accordance with the described techniques, the controller 104 receives the requests 118 from requestors, such as for the lanes 210 of the processor 206, to access the elements 114 of the data block 112 from the cache 102. To fulfill those requests 118, the elements 114 stored in the cache 102 in a compressed format are decompressed and then provided to the respective requestors.

This example 300 illustrates a scenario where the controller 104 receives two requests 118 for elements in the cache 102. For example, the controller 104 receives a first request 314 for a first lane 210 of the processor 206 and a second request 316 for a second lane 210 of the processor 206. In this example, the first request 314 requests access to the first unique element 302, the second unique element 304, the third unique element 306, and the fourth unique element 308. The second request 316 requests access to the third unique element 306, the fourth unique element 308, the fifth unique element 310, and the sixth unique element 312. Accordingly, the first requestor (e.g., the first of the lanes 210) and the second requestor (e.g., the second of the lanes 210) both request the third unique element 306 and the fourth unique element 308.

In one or more examples, the data elements 114 correspond to texels of a texture used to render computer graphics, e.g., video games, high-resolution image renderings, and so forth. In such examples, the data block 112 thus corresponds to a block of texels, such as an N×M block of texels. In the illustrated example, specifically, the data block 112 is depicted as a 4×4 block of elements 114 of data, e.g., a "quad." It is to be appreciated that in various implementations where the elements 114 are arranged in blocks, dimensions of the blocks differ from the dimensions of the depicted example.

In at least one example, the processor 206 performs one or more operations in relation to the texels of a texture, such as filtering the texels. To apply a filter to the texels, for instance, the processor 206 iterates over groups of the texels and provide control signals to the lanes 210, causing them to perform various computations in relation to the texels. By way of example, the illustrated example 300 depicts a scenario where the processor 206 causes the lanes 210 to iterate over 2×2 groups of elements 114. However, the lanes 210 are depicted executing instructions on those groups such that a 2×1 portion of a group used by the first lane 210 overlaps with a group used by the second lane 210. Certainly, sizes of groups of elements 114 accessed by a lane 210 to perform an operation differ for different operations and an amount of overlap (if any) also differs without departing from the spirit or scope of the described techniques.

To fulfill the first request 314 and the second request 316, the decompression routing system 106 obtains the compressed data block 116 or portions of the compressed data block 116 which correspond to the first unique element 302, the second unique element 304, the third unique element 306, the fourth unique element 308, the fifth unique element 310, and the sixth unique element 312. For instance, the controller 104 provides the compressed data to the decompression routing system 106 from the cache 102. The illustrated example includes a first portion 318, second portion 320, third portion 322, fourth portion 324, fifth portion 326, and sixth portion 328 of the compressed data block 116, which correspond to the first unique element 302, the second unique element 304, the third unique element 306, the fourth unique element 308, the fifth unique element 310, and the sixth unique element 312, respectively.

In accordance with the described techniques, the first crossbar 202 routes the first portion 318 to a first of the decompressors 108, the second portion 320 to a second of the decompressors 108, the third portion 322 to a third of the decompressors 108, the fourth portion 324 to a fourth of the decompressors 108, the fifth portion 326 to a fifth of the decompressors 108, and the sixth portion 328 to a sixth of the decompressors 108. The illustrated example 300 also depicts an Nth decompressor 108, which is not depicted obtaining compressed data for decompression or outputting decompressed data. This is because in the illustrated example, there are six unique elements of data in relation to which decompression is performed, and the decompression routing system 106 routes the compressed portions so that they are decompressed by six respective decompressors 108.

This contrasts with conventional approaches which use eight decompressors to perform eight decompressions for the requested elements, one decompression for each of the four elements requested via the first request 314 and also for each of the four elements requested via the second request 316. This includes two decompressions of the third portion 322 (e.g., by two decompressors) to output the third unique element 306 twice and also includes two decompressions of the fourth portion 324 (e.g., by two decompressors) to output the fourth unique element 308 twice. The decompression routing system 106 also contrasts with conventional systems that use two decompressors to perform eight decompressions, e.g., where each decompressor performs four decompressions of compressed data over four cycles. Such conventional approaches use a first decompressor to decompress the portions of compressed data that correspond to the four elements of the first request 314 (one portion per cycle over four cycles) and use a second decompressor to decompress the portions of compressed data that correspond to the four elements of the second request 316 (one portion per cycle over four cycles). Both of those conventional approaches decompress the third portion 322 and the fourth portion 324 twice each.

In contrast, the decompression routing system 106 limits the third portion 322 and the fourth portion 324 to being decompressed once each. As noted above, the first crossbar 202 routes the portions of data 318-328 to respective decompressors 108 so that they are decompressed by a single decompressor 108. The second crossbar 204 routes the output of the decompressors 108—the first unique element 302, the second unique element 304, the third unique element 306, the fourth unique element 308, the fifth unique element 310, and the sixth unique element 312—to the respective lanes 210 of the processor 206. This includes routing the elements requested for multiple lanes to each of those lanes.

By way of example, the second crossbar 204 routes the first unique element 302, the second unique element 304, the third unique element 306, and the fourth unique element 308 to a first of the lanes 210, which corresponds to the first request 314. The second crossbar 204 also routes the third unique element 306, the fourth unique element 308, the fifth unique element 310, and the sixth unique element 312 to a second of the lanes 210, which corresponds to the second request 316. Accordingly, the second crossbar 204 routes the third unique element 306 from the output of the respective decompressor 108 to both the first and second of the lanes 210. The second crossbar 204 also routes the fourth unique element 308 to both the first and second of the lanes 210. By routing the output of a single decompressor 108 to multiple lanes, the decompression routing system 106 "reuses" the output of the decompressor to fulfill multiple requests for a data element, e.g., in a single cycle. In one or more implementations, though, the decompression routing system 106 fulfills the multiple requests by reusing the output of a single decompressor across multiple cycles. For example, the decompression routing system 106 provides a decompressed data element to a first requestor during a first cycle and subsequently provides the same decompressed data element to a second requestor during a second cycle, e.g., without performing a second decompression for the data element.

Figure 4:
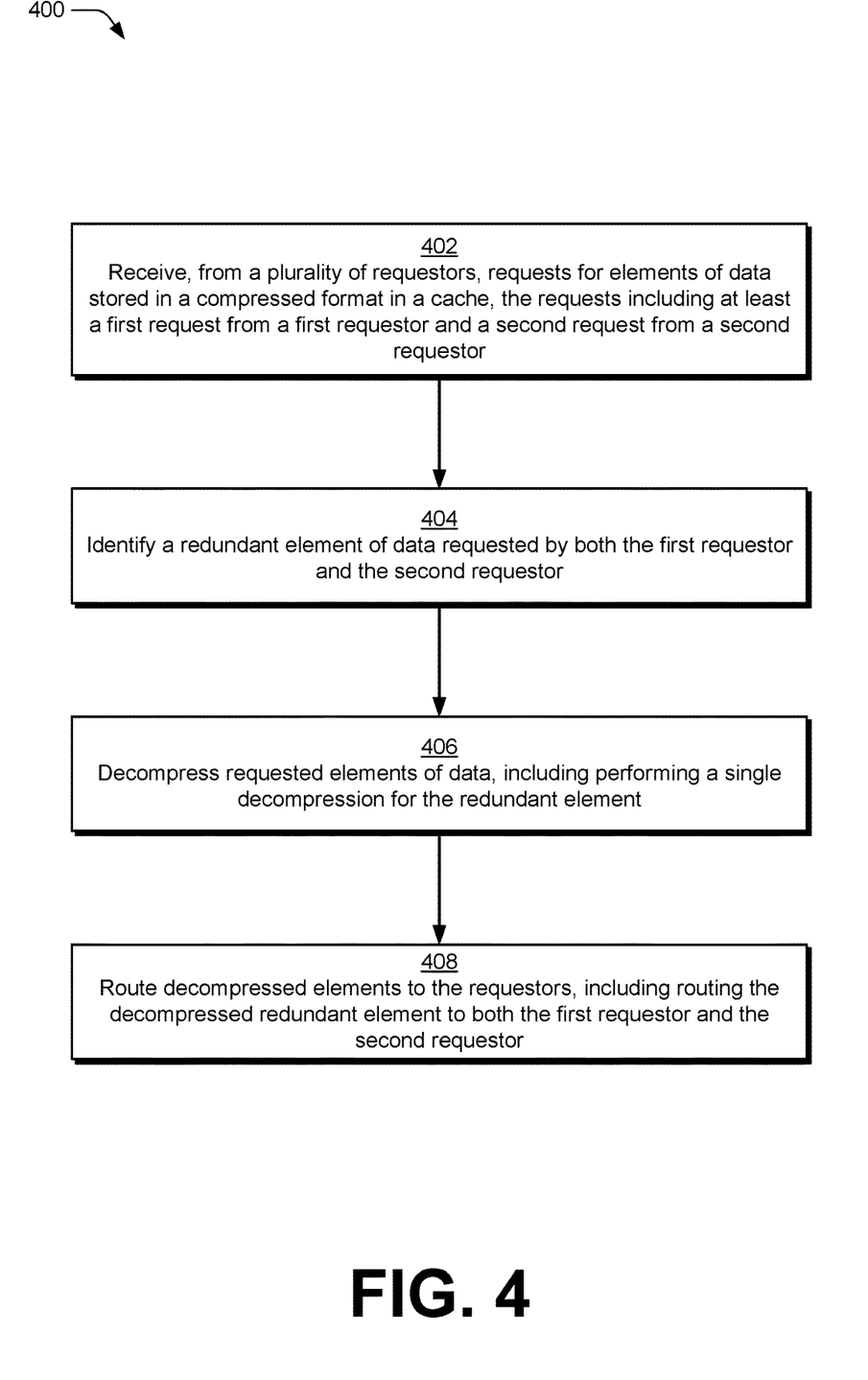
FIG. 4 depicts a procedure in an example implementation of data routing for efficient decompression of compressed data stored in a cache.

FIG. 4 depicts a procedure 400 in an example implementation of data routing for efficient decompression of compressed data stored in a cache.

Requests are received for elements of data stored in a compressed format in a cache (block 402). In accordance with the principles discussed herein, the requests are received from a plurality of requestors, and the requests include at least a first request from a first requestor and a second request from a second requestor. By way of example, the controller 104 receives the requests 118 for one or more of the elements 114 of the data block 112, the data block 112 is compressed into the compressed data block 116, and the compressed data block 116 is stored in the cache 102. The controller 104 receives the requests 118 from a plurality of requestors, such as from a plurality of the lanes 210 of the processor 206. The requests 118 include at least a first request from a first requestor and a second request from a second requestor.

A redundant element of data requested by both the first requestor and the second requestor is identified (block 404). By way of example, the redundancy detector 110 identifies a redundant element 114 requested via the requests 118 by the first requestor and the second requestor.

Requested elements of data are decompressed (block 406). In accordance with the principles discussed herein, decompression of the requested elements includes performing a single decompression operation for the redundant element. By way of example, the decompressors 108 decompress the compressed data block 116 or portions of the compressed data block 116 that correspond to the elements 114 requested by the requests 118 received at block 402. The decompression routing system 106 routes the portions of compressed data block 116 or the portions of the compressed data block 116 so that a single decompression is performed by the decompressors 108 for the redundant element 114 identified at block 404. In particular, a single decompressor 108 is used to decompress the compressed data that corresponds to the redundant element 114 identified at block 404. In the context of FIG. 1, the decompressors 108 output the first decompressed non-redundant element 120, the decompressed redundant element 122, and the second decompressed non-redundant element 124, as a result of decompressing the respective portions of the compressed data block 116.

Decompressed elements are routed to the requestors (block 408). In accordance with the principles discussed herein, the routing includes routing the decompressed redundant element to both the first requestor and the second requestor. By way of example, the decompression routing system 106 routes the first decompressed non-redundant element 120, the decompressed redundant element 122, and the second decompressed non-redundant element 124 to the requestors corresponding to the requests 118.

In this example, for instance, the decompression routing system 106 routes the first decompressed non-redundant element 120 and the decompressed redundant element 122 to the first requestor and routes the decompressed redundant element 122 and the second decompressed non-redundant element 124 to the second requestor. Accordingly, the decompression routing system 106 routes the decompressed redundant element 122 to both the first requestor and the second requestor. In one example, the decompression routing system 106 routes the decompressed redundant element 122 to the first requestor and the second requestor in a same cycle. In another example, the decompression routing system 106 routes the decompressed redundant element 122 to the first requestor and the second requestor in different cycles, e.g. a first cycle and a subsequent, second cycle.

Figure 5:
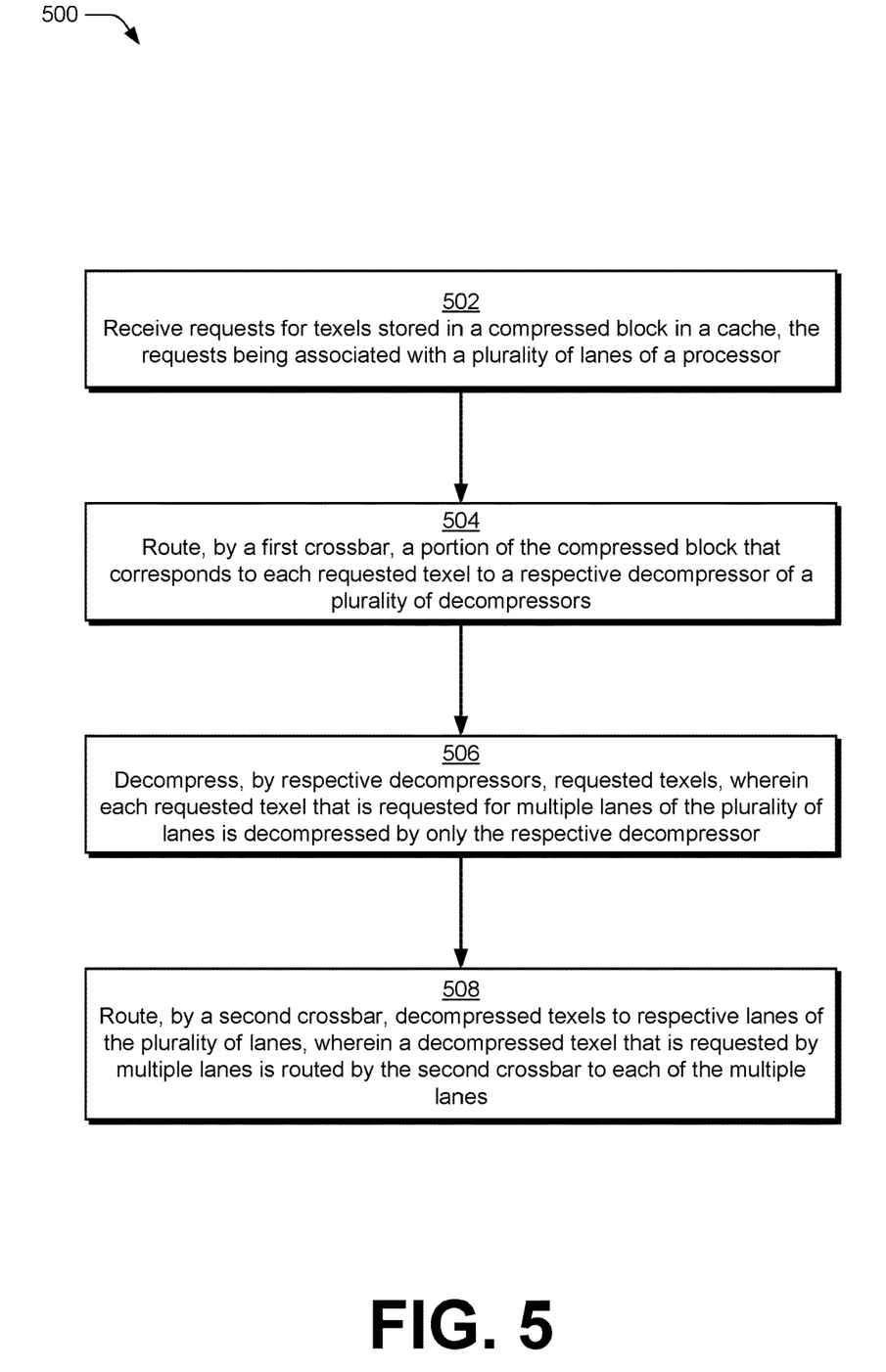
FIG. 5 depicts a procedure in an example implementation of data routing for efficient decompression of compressed texels stored in a cache and for routing the decompressed texels to lanes of a vector processor.

FIG. 5 depicts a procedure 500 in an example implementation of data routing for efficient decompression of compressed texels stored in a cache and for routing the decompressed texels to lanes of a processor.

Requests are received for texels stored in a compressed block in a cache (block 502). In accordance with the principles discussed herein, the requests are associated with a plurality of lanes of a processor. In at least one example, the elements 114 of the data block 112 correspond to texels of a texture, such as a texture used to render computer graphics. Thus, the first unique element 302, the second unique element 304, the third unique element 306, the fourth unique element 308, the fifth unique element 310, and the sixth unique element 312, each correspond to a different texel in this example.

In accordance with the described techniques, the controller 104 receives the requests 118 for one or more texels of the data block 112, the data block 112 is compressed into the compressed data block 116, and the compressed data block 116 is stored in the cache 102. The controller 104 receives the requests 118 for a plurality of the lanes 210 of the processor 206. For example, the requests 118 include at least the first request 314 associated with a first of the lanes 210 and the second request 316 associated with a second of the lanes 210.

A portion of the compressed block that corresponds to each requested texel is routed to a respective decompressor of a plurality of decompressors by a first crossbar (block 504). By way of example, the first crossbar 202 routes the first portion 318 of the compressed data block 116 to one of the decompressors 108, the second portion 320 of the compressed data block 116 to a different one of the decompressors 108, the third portion 322 of the compressed data block 116 to a different one of the decompressors 108, the fourth portion 324 of the compressed data block 116 to a different one of the decompressors 108, the fifth portion 326 of the compressed data block 116 to a different one of the decompressors 108, and the sixth portion 328 of the compressed data block 116 to a different one of the decompressors 108.

Requested texels are decompressed by respective decompressors (block 506). In accordance with the principles discussed herein, each requested texel that is requested for multiple lanes of the plurality of lanes is decompressed by only the respective decompressor. By way of example, the portions 318-328 of the compressed data block 116 are decompressed by respective decompressors 108. By performing the decompression (e.g., linear interpolation), the respective decompressors 108 produce the first unique element 302, the second unique element 304, the third unique element 306, the fourth unique element 308, the fifth unique element 310, and the sixth unique element 312. In this example, the third unique element 306 and the fourth unique element 308 are requested by both the first of the lanes 210 and the second of the lanes 210. Notably though, the third portion 322 is decompressed by only its respective decompressor 108 to produce the third unique element 306, and the fourth portion 324 is decompressed by only its respective decompressor 108 to produce the fourth unique element 308. In various implementations, the decompressing at block 506 includes preventing a decompressor 108 from decompressing the portion of the compressed data block 116 that is decompressed by another decompressor 108.

Decompressed texels are routed to respective lanes of the plurality of lanes by a second crossbar (block 508). In accordance with the principles discussed herein, a decompressed texel that is requested by multiple lanes is routed by the second crossbar to each of the multiple lanes. By way of example, the second crossbar 204 routes the first unique element 302, the second unique element 304, the third unique element 306, the fourth unique element 308, the fifth unique element 310, and the sixth unique element 312, as they are output by the decompressors 108 to the lanes 210 that requested the texels. This includes routing the third unique element 306 as output by the respective decompressor 108 to both the first of the lanes 210 and the second of the lanes 210, e.g., since both of those lanes 210 requested the third unique element 306.

In one example, the decompression routing system 106 routes the third unique element 306 to both the first of the lanes 210 and the second of the lanes 210 in a same cycle. In another example, the decompression routing system 106 routes the third unique element 306 to the first of the lanes 210 and to the second of the lanes 210 in different cycles, e.g. a first cycle and a subsequent, second cycle.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the cache 102, the decompression routing system 106, the decompressors 108, and the redundancy detector 110) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
receiving, from a plurality of requestors, requests for elements of data stored in a compressed format in a cache, the requests including at least a first request from a first requestor and a second request from a second requestor;
identifying a redundant element of data requested by both the first requestor and the second requestor;
decompressing requested elements of the data, the decompressing including performing a single decompression for the redundant element; and
routing decompressed elements to the plurality of requestors, the routing including routing the decompressed redundant element from an output of at least one decompressor via at least one crossbar to both the first requestor and the second requestor.

2. The method of claim 1, wherein the decompressed redundant element is routed to both the first requestor and the second requestor in a same cycle.

3. The method of claim 1, wherein the decompressed redundant element is routed to the first requestor and the second requestor in different cycles.

4. The method of claim 1, further comprising reusing the decompressed redundant element to serve a subsequent request without performing a second decompression for the redundant element.

5. The method of claim 1, further comprising:
routing different portions of the data stored in the compressed format to respective decompressors, the different portions of data each corresponding to a requested element; and
decompressing, by each respective decompressor, a different portion to produce a respective decompressed element.

6. The method of claim 5, wherein the at least one crossbar includes a first crossbar and a second crossbar, and the different portions of data are routed to inputs of the respective decompressors via the first crossbar.

7. The method of claim 6, wherein the decompressed elements are routed from outputs of the respective decompressors to the plurality of requestors via the second crossbar.

8. The method of claim 1, wherein the elements of data are texels of a texture for computer graphics.

9. The method of claim 8, wherein the compressed format is a compressed block of the texels.

10. The method of claim 1, wherein the elements of data stored in the compressed format are each unique, one element to another, and the redundant element is a unique element requested via the first request and the second request.

11. The method of claim 1, wherein at least one of the first request and the second request includes the redundant element of data and a non-redundant element of data, and wherein the routing includes routing the non-redundant element of data to the first requestor or the second requestor.

12. A system comprising:
a cache to store data in a compressed format;
a controller to receive requests from a plurality of requestors for access to elements of the data in the cache, the requests including at least a first request from a first requestor and a second request from a second requestor; and
a decompression routing system having at least one decompressor and at least one crossbar, the decompression routing system configured to:
identify a redundant element of data requested by both the first requestor and the second requestor;
decompress requested elements of the data, including performing a single decompression for the redundant element; and
route decompressed elements to the plurality of requestors, including routing the decompressed redundant element from an output of the at least one decompressor via the at least one crossbar to both the first requestor and the second requestor.

13. The system of claim 12, wherein the decompression routing system includes a plurality of decompressors to decompress portions of the data stored in the compressed format to produce the decompressed elements.

14. The system of claim 12, wherein the at least one decompressor includes respective decompressors and the at least one crossbar includes a first crossbar and a second crossbar connected to the respective decompressors, wherein:
the first crossbar is configured to route different portions of the data stored in the compressed format to inputs of the respective decompressors, the different portions of data each corresponding to a requested element; and the second crossbar is configured to route the decompressed elements from outputs of the respective decompressors to the plurality of requestors.

15. The system of claim 14, wherein the first crossbar routes a different portion of data to a single decompressor for decompression, and the single decompressor decompresses the different portion and not other different portions of the data.

16. The system of claim 12, wherein the requested elements of the data include the redundant element of data and a non-redundant element of data, and wherein the routing includes routing the non-redundant element of data to the first requestor or the second requestor.

17. A method comprising:
   receiving requests for texels stored in a compressed block in a cache, the requests being associated with a plurality of lanes of a processor;
   routing, by a first crossbar, a portion of the compressed block that corresponds to each requested texel to a respective decompressor of a plurality of decompressors;
   decompressing, by respective decompressors, requested texels, wherein each requested texel that is requested for multiple lanes of the plurality of lanes is decompressed by the respective decompressors, wherein at least one texel that is requested by multiple lanes is decompressed in a single decompression by a single one of the respective decompressors; and
   routing, by a second crossbar, decompressed texels to respective lanes of the plurality of lanes, wherein the at least one texel, once decompressed, is routed by the second crossbar to each of the multiple lanes.

18. The method of claim 17, further comprising decompressing, by the respective decompressors, the requested texels in a same cycle.

19. The method of claim 17, further comprising decompressing, by the respective decompressors, the requested texels in different cycles.

20. The method of claim 17, wherein the decompressing further includes preventing a decompressor from decompressing the portion of the compressed block that is decompressed by another decompressor.

* * * * *